April 10, 1934.  A. KINDELMANN ET AL  1,953,985
FILM MAGAZINE FOR AMATEUR MOTION PICTURE CAMERAS
Filed July 18, 1931   3 Sheets-Sheet 1

INVENTORS
Albert Kindelmann.
Ellis L. Jones.
Julius Pearlman.
William Ostrander.
BY their ATTORNEYS
Austin & Dix April 10, 1934.  A. KINDELMANN ET AL  1,953,985
FILM MAGAZINE FOR AMATEUR MOTION PICTURE CAMERAS
Filed July 18, 1931   3 Sheets-Sheet 2
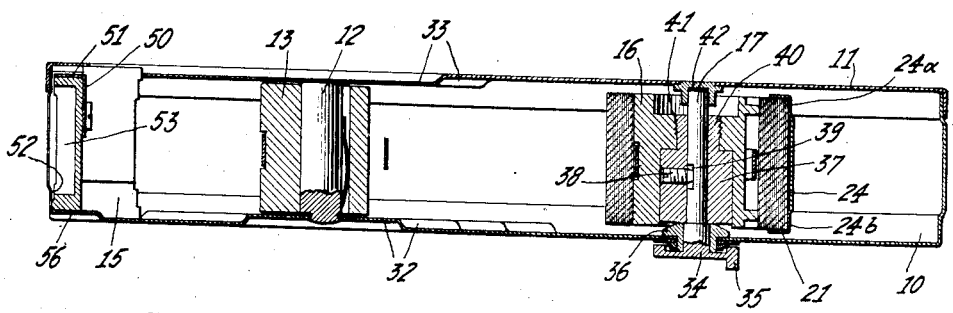
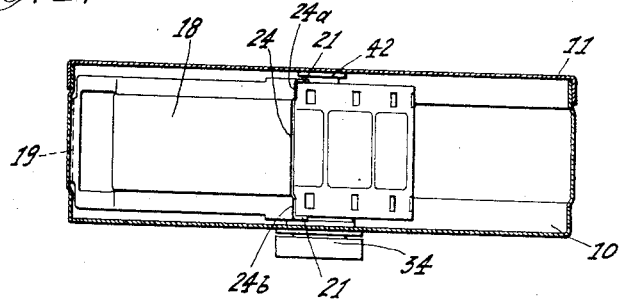
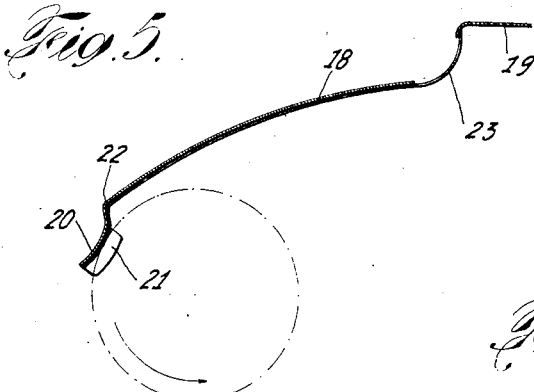
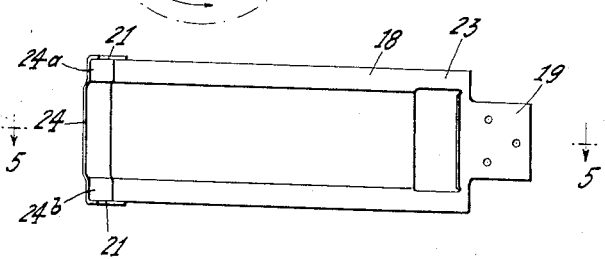
INVENTORS
Albert Kindelmann.
Ellis L. Jones.
BY their ATTORNEYS  Julius Pearlman.
William Ostrander.

April 10, 1934.  A. KINDELMANN ET AL  1,953,985
FILM MAGAZINE FOR AMATEUR MOTION PICTURE CAMERAS
Filed July 18, 1931   3 Sheets-Sheet 3
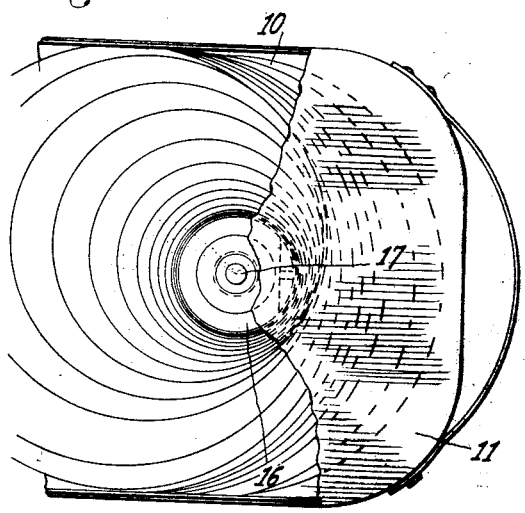
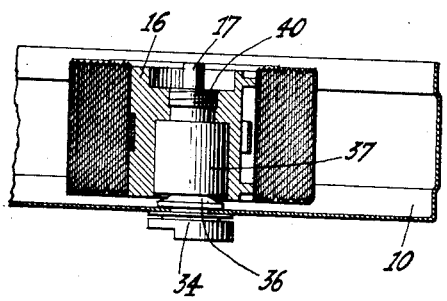
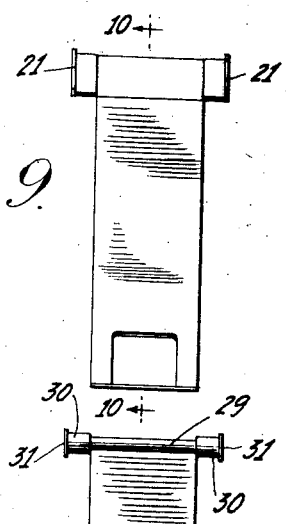
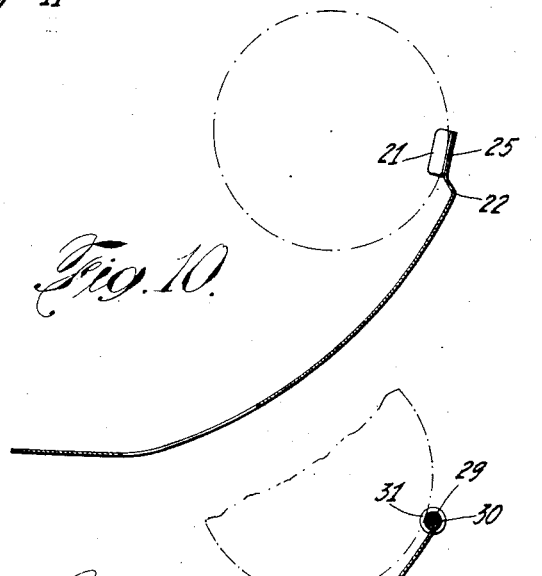
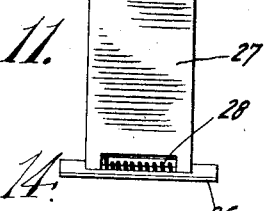
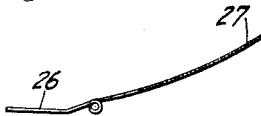
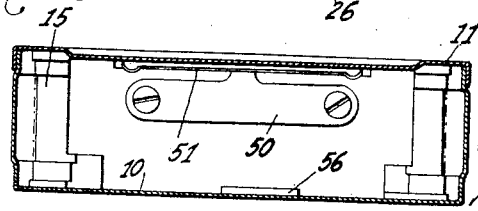
INVENTORS
Albert Kindelmann.
Ellis L. Jones.
Julius Pearlman.
William Ostrander.
BY their ATTORNEYS Patented Apr. 10, 1934

1,953,985

UNITED STATES PATENT OFFICE 1,953,985

FILM MAGAZINE FOR AMATEUR MOTION PICTURE CAMERAS

Albert Kindelmann, Floral Park, Ellis L. Jones, Bellaire, Julius Pearlman, New York, N. Y., and William Ostrander, Roselle Park, N. J., assignors to International Projector Corporation, New York, N. Y., a corporation of Delaware Application July 18, 1931, Serial No. 551,710

7 Claims. (Cl. 242—71)

This invention relates to new and useful improvements in removable film magazines for amateur motion picture cameras.

One of the objects of this invention is to provide a novel film carrying magazine having improved elements thereof cooperating with the film as it is moved from the supply spool to the take-up spool, such elements and their cooperation resulting in a desired efficiency and an elimination of much of the former friction and other losses.

Another object of the invention is to provide a simple, economical and efficient means for permitting the film to be wound uniformly and evenly on a spool such as a take-up spool in a manner to prevent the film rubbing against the walls of the magazine which oftentimes has heretofore caused jamming and snarling of the film.

A further object of the invention is to provide simple and efficient means whereby the magazine walls are strengthened especially adjacent the supply spool to prevent undue pressure on the sides of the film and to insure the accurate linear passage of the film from the supply spool to and past the aperture opening in the magazine.

A still further object resides in improved details of construction of the take-up drive shaft and the manner in which the take-up spool is mounted thereon to insure easy driving of the take-up shaft with substantial uniformity in the rotation of the shaft to enhance the uniform winding of the film on the take-up spool.

Further and more specific objects, features and advantages will more clearly appear from a consideration of the specification hereinafter taken in connection with the accompanying drawings which form part of the specification and which illustrate a present preferred form of the invention.

It has been found when the film is being wound on a spool that unless some means is provided to confine or guide its lateral edges it will wind up irregularly with respect to its lateral plane and that the side faces of the film thus rolled up present an irregular or wavy formation which causes a friction drag. It is for this reason that the well known ordinary film reels have side plates.

In a removable magazine of the type herein disclosed it is not usually economically efficient, nor convenient to provide regular film reels because of the simplicity and low cost of the apparatus and the desire to keep the number of parts as low as possible. Consequently the film is introduced into the magazine in roll form without side members. The film preferably is simply wound on small spools.

Since it has been discovered that especially on the take-up spool that the film tends to have this wavy lateral faces and because of this and the closeness of the adjacent walls of the magazine the film before it is wound on the take-up spool to any extent commences to rub against the wall of the magazine, either the top or the bottom or both, and such engagement produces a retarding friction. This retardation causes the film to jam up and snarl and to be wound up very unevenly and shortly thereafter prevents further running of the film. Instead of being wound smoothly and tight with substantial even tension it is wound very uneven. A given amount of film thus loosely wound occupies several times as much space as before and soon fills the space in the magazine and causes jamming therein before the entire length of the film has been exposed. This disadvantage is highly objectionable and has caused great waste.

There has been developed a very simple economical device or element to overcome the above defect. In the preferred form this device or element comprises a simple guide means which is pressed lightly against the film to cause it to wind fairly tightly. In addition it is advantageous to have ears or flaps on the guide and to have them extend on each side to engage the edges of a few of the outer layers of the film to thus guide and restrain these layers from lateral movement out of the uniform smooth lateral planes in which they are intended to be wound. This simple means preferably comprises a flat spring positioned to accomplish its intended purpose. Usually it is fastened at one end to the wall of the magazine and its free end presses lightly against the outer periphery of the film reel. The spring may be of any desired construction and shape. It usually has bent flat laterally extending ears or flaps which extend radially along opposite edges of the outer layers of the film. Preferably this portion of the free end of the spring member is curved to provide a minimum area of contact with the film since no particular friction or resistance is desired and the member is merely held against the film with enough pressure to keep it from being thrown from the film by the sometimes jerky motion of the film movement. Other forms or modifications of simple guiding devices are also shown herein.

A further feature of the invention comprises provision of the walls of the magazine adjacent the supply spool with corrugations of predetermined depth so that the supply spool roll of film is confined to a relatively narrow predetermined path of movement, the lines of which define the normal path of movement of the film to the gate plate. This insurance of a predetermined path for the film from the supply roll to the gate enhances the accurate movement of the film without undue friction and without any tendency to bind.

Another feature of the invention includes a take-up drive shaft which is floatably supported on one wall of the magazine and journalled in a suitable socket on the cover of the magazine at its free end when the cover is in place. This provides a shaft which can be driven with minimum power requirement and will be disposed in accurate axial alignment when in operation to enhance the accurate uniform winding of the film on the take-up spool. This spool is preferably threadably mounted on a sleeve keyed to the shaft so that the connection between the spool and the shaft is exceptionally rigid and secure. The walls of the magazine adjacent the lateral face of the take-up reel are preferably smooth although they may be corrugated or uneven if desired. The length of the take-up shaft and of the supply shaft are calculated to be approximately the same as the normal distance between the top and bottom of the magazine so that the top and bottom walls of the magazine can not be pinched together by the hand, especially at points adjacent the roll of film therein.

The present preferred form of the invention is shown in the drawings of which:

Fig. 3 is a vertical longitudinal section taken on the line 3—3 of Fig. 1;

Fig. 4 is a vertical cross-section taken on the line 4—4 of Fig. 1;

Fig. 5 is a section of the spring taken on the line 5—5 of Fig. 6, and showing the spring in position for attachment to another portion of the magazine wall, but having the same rotative relation to the film as shown by the arrows in Figs. 5 and 1;

Fig. 6 is a plan view of this spring;

Fig. 7 is a partial plan view partly broken away showing the way in which a film tends to jam and become distorted in the magazine without the guiding spring of the present invention;

Fig. 8 is a vertical section through the film when wound up without the guiding spring showing the manner in which its edges tend to deviate laterally from the straight plane;

Fig. 9 is an elevational view of a modified form of guide spring;

Fig. 10 is a longitudinal section through the modified form of spring;

Fig. 11 is an elevational view of a flat modified form of spring with rollers;

Fig. 12 is a longitudinal section through the modified form shown in Fig. 11;

Fig. 13 is an enlarged cross-section through the gate-plate showing the pressure foot and spring; and Fig. 14 is a section looking towards the inner face of the gate plate.

Figure 1:
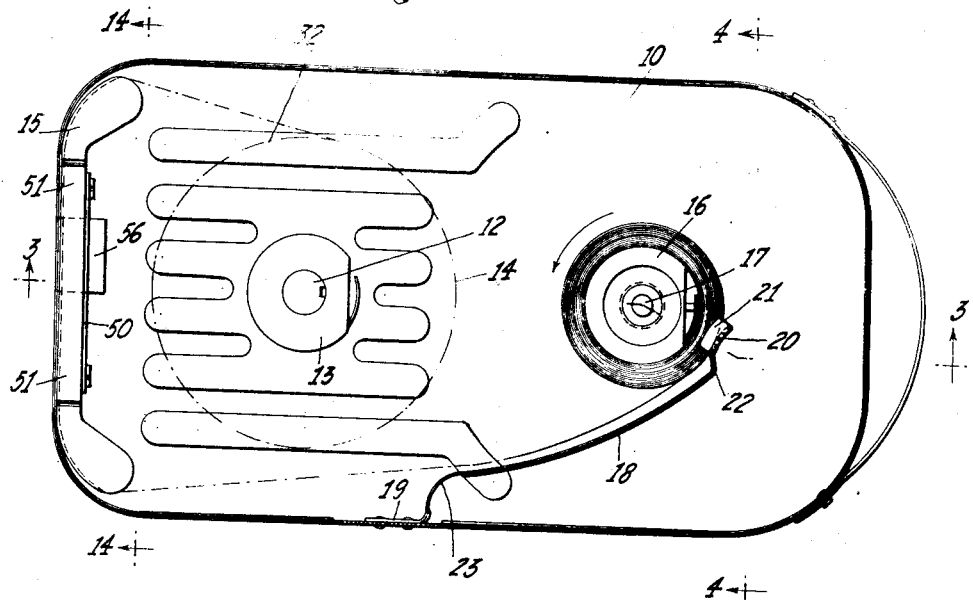
Fig. 1 is a plan view of the magazine showing a portion of the film wound up on the take-up spool.

As illustrated in the drawings the present preferred form of the invention comprises a casing within which the film is disposed on a supply spool from which it is unwound to be taken up on a take-up spool driven by suitable mechanism in the camera within which the magazine is removably inserted. It has been found that especially on the take-up spool the film when unguided or controlled in any manner has a tendency to wind up in an uneven manner as shown in Fig. 8, so that its lateral edges do not lie in a smooth plane but have a wavy formation. When the cover of the magazine is used this lateral deviation of the film causes it to rub against the cover creating friction which slows up the take-up and causes an uneven tension in the film. The result of this unevenness causes the film to wind up very loosely and unevenly as shown in Fig. 7, so that before the film has been completely run off the supply spool it jams within the magazine because of this irregularity in the winding. That the contact of the cover with the edges of the film produces this effect has been proven by taking the cover off whereupon the film will wind up with fairly uniform tension although still having an uneven wave-like deviation, as above-mentioned and as shown in Fig. 8. The film as shown in Fig. 7 will wind up loosely and unevenly and in any given wind-up it is impossible to tell just what direction the loose loops of the film will spread. As shown in this figure they have been indicated as spreading loosely in all directions from the central spool until they jam and have frictional contact with the side walls of the magazine. This is indicated by the solid and dotted lines indicating the loose loops of the film on both sides of the spool. However, in some instances these loose loops may be formed in the major part on only one side or the other of the spool.

The removable magazine comprises a shallow casing 10 having a cover 11. Within the casing 10 is mounted a shaft 12 on which a supply spool 13 is connected. This spool has thereon the film indicated at 14. The film passes from the spool 13 over the top of the gate-plate 15 down and between the adjacent wall of the casing 10 and then across the bottom of the gate-plate 15 toward the take-up spool 16 mounted on the take-up shaft 17 which is rotatably journalled in the casing in a manner to be hereinafter described.

It has been found that the film on the take-up spool 16 can be wound with fairly uniform tension and with smooth lateral faces merely by providing a small light weight guiding member to press lightly against the outer face of the roll of film and to partially embrace the lateral edges of one or more of the outer layers of the film. This guiding means in one form comprises the spring strip 18 which is riveted at one end 19 to the wall of the casing. The opposite free end 20 of this guiding means has a curved bottom surface pressing lightly against the outer layer of film with inwardly projecting ears such as 21 somewhat closely along the side of one or more of the several outer layers of the film. It is preferred to have this free end curved so that there will be only a line engagement irrespective of the diameter of the film roll. This curved end of the guiding member is connected to the main body of the spring but preferably off-set therefrom by reason of the relatively sharp curvature of the spring as indicated at 22. This is for the purpose of insuring that the film does not to any appreciable extent contact with the main body of the guiding member except along a portion of the curved surface 20. This improved construction eliminates any undue or unnecessary retarding friction between the spring and the film. The only pressure of the spring member on the film is that designed to be sufficient to keep the member from being thrown away from the film under any intermittent throw action film or of the take-up and of the drive of the take-up shaft 17. Adjacent its fixed end 19, the spring guide member 18 is also preferably sharply curved as at 23 to give it added resilience without the use of extra and separate springs and without requiring unnecessary power to bend the spring.

It is believed that the guiding action of the ears 21 on the take-up roll of film keeps its lateral edges in given planes and prevent the wavy-formation indicated in Fig. 8 and thus keeps the film from having frictional contact with the top and bottom and side walls of the casing so that the jamming and spreading of the film indicated in Fig. 7 are avoided and the film is wound smoothly and evenly permitting the whole length of film to be used, whereas without this type of guiding member the film may early jam in the casing before any substantial part of it had been exposed. An examination of Fig. 6 will indicate that the central portion of this spring member especially where it contacts with the film is provided with an off-set portion 24 to prevent this central portion of the spring from coming in contact with the picture sections of the film and rubbing against them to their detriment. This construction forms shoulders 24a and 24b with which the edges of the film contact. It is understood, however, that this depression need not always be employed and that the surface of this end of the spring member may be preferably flat. Figs. 5 and 6 are sectional and plan views of the same spring guide members as shown in Fig. 1, except that in this instance the spring is shown in such a position as to permit it to be attached to the wall of the magazine opposite to that wall to which it is shown attached in Fig. 1. Nevertheless, it will be clearly seen from the direction of the arrows on the roll of film in Figs. 1 and 5, that the position of the spring in either case has the same angular relation to the rotative direction of the film and the action and function of the spring is the same in both cases. This alternative arrangement or disposition of the spring is indicated because in some commercial situations it may be desirable to connect the spring to a different wall of the magazine than that shown in Fig. 1.

In Figs. 9 and 10 there is shown a modified form of guide member in which there is no curved portions such as 23 and in which the contact surface 25 is flat, but which is still provided with the off-set curved portion 22 and with ears 21.

In Figs. 11 and 12 there is shown a still more modified form wherein the spring member is made of two pieces, one piece 26 associated with the casing 10 and the other piece 27 connected thereto by a pivotal joint and held against the roll of film by means of suitable coiled springs such as 28 and connected to the portion 27. The outer end of this portion 27 is provided with a shaft 29 having on its ends rollers 30 provided with flanges 31. These flanges act in a manner similar to the action of the ears 21 which lie closely adjacent the outer layers of film to guide and restrain them.

Figure 2:
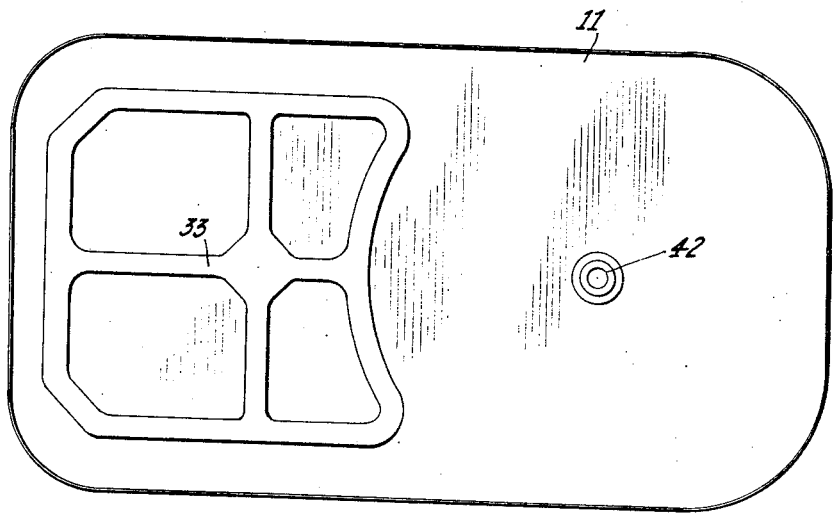
Fig. 2 is a plan view of the cover of the magazine.

In Figs. 1 and 2 it will be noted that the left-hand portion of the casing 10 and the cover 11 adjacent the supply roll of film are provided with a series of corrugations 32 and 33. This construction tends to strengthen the bottom and top walls of the casing and are of such predetermined depth that they lie, as shown in Fig. 3, fairly closely adjacent the lateral edges of the film on the supply spool. The predetermination of the depth of these corrugations is to determine the path of the film as it moves off the supply roll so as to make the path practically coincident with the path of movement of the film across the gate-plate so that there is practically no lateral deviation of the film from the time it leaves the supply spool until it leaves the gate plate. This insures smooth, uniform linear movement of the film.

A further feature of the invention details the support and mounting of the take-up spool and the spool drive shaft to insure a more rigid mounting to enhance the uniform even winding of the film on the take-up spool.

Referring to Fig. 3 it will be seen that the take-up shaft 17 is provided at its outer end with a rotatable disk 34 having a projecting pin 35 engageable by suitable mechanisms within the camera to rotate the disk. This disk which is formed controllably integral with the shaft 17 has a cooperating inner ring 36 to journal the shaft and the disk freely for rotation on the bottom wall of the casing. This construction is not so tight as to cause a binding action and the shaft may be rotated with a minimum of power. Around the shaft is disposed a sleeve-like plug 37 having a set screw 38 projecting into the slot 39 on the shaft to lock the plug 37 on the shaft. The upper end 40 of the plug has a reduced diameter and threaded to enter a threaded bore 41 on the take-up spool 16. The direction of the thread is such that when the spool is driven it tends to tighten up on the threads. The cover 11 over the top of the end of the shaft 17 is fastened thereto in any suitable manner. The journal or socket 42 which when the cover is in position, will engage fairly snugly the upper end of the shaft 17 to act as an end bearing and to create the least friction. In this manner it will be observed that while the take-up shaft 17 is mounted to be driven freely with a minimum of power it nevertheless is securely journalled between the bottom and cover of the casing so that when thus journalled, its rotation will be accurate and not involve any axial deviation. This accuracy and regularity of rotation of the shaft thus insured will further enhance the smooth, even winding of the film which is eminently desired for the reasons previously mentioned.

The gate-plate 15 it will be noted is provided with a depression 52 on the outer longitudinal face thereof. The film lies in and travels along this depression and is guided thereby. One lateral edge of the film is engaged by spring arms 51 disposed along one face of the gate-plate 15 and forming part of a side plate 50 screwed to the inner face of the gate-plate. These spring arms 51 press against the lateral edge of the film and tend to keep it in proper lateral position.

The gate-plate 15 is also provided with a recess 53 within which is sometimes disposed a pressure foot 54 backed by a spring 55. This spring presses the plate or pressure foot 54 against the film. The magazine is also shown provided with a registration groove 56 adapted to register with a corresponding projection, as shown, disposed within the camera into which this magazine is disposable. It will be noted that as the film is unwound from the supply reel it will pass along the depression 52 in the gate-plate and is held in proper position against the aperture in the magazine and with respect to the optical axis by means of the pressure foot. But whenever the pressure foot is not employed, it will be noted, that the tendency of the film is to curl and bulge outwardly toward the aperture of the magazine and in so doing maintain itself in position preferably against a suitable frame (not shown) in the camera.

It will be noted that the elements and features herein provide a very simple and efficient means for moving the film as it is wound on the take-up spool so that its lateral faces present a relatively smooth surface and lie in planes without having the usual objectionable wavy formation. Thus the film can be wound up uniformly with even tension without having the undesirable frictional contact with the walls of the magazine which have hitherto caused the jamming and snarling of the film long before its entire length could be run through the magazine. Furthermore, the side wall of the magazine adjacent the supply roll is strengthened and a path of predetermined direction is provided for the film in traveling from the supply spool to the gate-plate. Furthermore, a free floating take-up shaft is provided which, however, is rigidly supported when in operation but may be driven with minimum power and which has securely fastened thereon a take-up spool which when in position practically becomes an integral part of the take-up shaft. The features disclosed herein are simple, economical to make, and capable of very easy disassembly for replacement and repairs.

While the invention has been described in detail and with respect to a present preferred form thereof it is not to be limited to such details and forms since many changes and modifications may be made in the invention without departing from the spirit and scope of the invention in its broadest aspects. Hence it is desired to cover any and all forms and modifications of the invention which may come within the language or scope of any one or more of the appended claims.

What is claimed, is:

1. A film guiding flat spring element for magazines of motion picture cameras, one end adapted to be fixed to a support, the opposite end having a curved surface adapted to bear against the periphery of a roll of film, a free end of the spring being offset from the main portion thereof and wings on its free end disposed to extend along the edges of the film.

2. A film guiding flat spring element for magazines of motion picture cameras, one end adapted to be fixed to a support, the opposite end having a curved surface adapted to bear against the periphery of a roll of film, the free end of the spring being offset from the main portion thereof and wings on its free end disposed to extend along the edges of the film, the central longitudinal portion of at least the film contacting end of the spring being depressed to avoid contact with the picture sections of the film.

3. A film engaging spring element for magazines of motion picture cameras having one end adapted to be connected to a support, a main body portion, a curved off-set portion between the main body portion and the fixed end to give resiliency to the main body portion, the film contacting end being curved, lateral wings on the free end to extend along the lateral edges of a film roll, the free end being off-set from the main body portion.

4. A film engaging spring element for magazines of motion picture cameras comprising a flat end portion to be fixed to a support, a main body portion extending from the fixed portion, a film contacting free end portion offset from the main body portion and having a flat formation and lateral wings on the free end portion adapted to lie along the side edges of a film roll.

5. A film engaging spring element for magazines of motion picture cameras comprising a flat end portion adapted to be fixed to a support, a main body portion of curved spring metal pivoted thereto, a coiled spring connected to one end to the fixed portion and at the other end to the main body portion tending to urge the main body portion in a given direction, a shaft on the free end of said main body portion and flanged rollers on opposite ends of said shaft, the flanges of said rollers adapted to extend along the side edges of a roll of film.

6. A removable film magazine for amateur motion picture cameras comprising a rotatable take-up shaft rotatively journalled on one wall of the magazine, a screw threaded plug keyed to said shaft, and a take-up spool having an interior threaded bore to be mounted on said plug, the movement of the shaft on the threads on said plug tending to tighten the spool and the plug when the shaft is driven.

7. A removable film magazine for amateur motion picture cameras comprising a rotatable take-up shaft journalled on one wall of the magazine, a through-threaded plug keyed to said shaft, and a take-up spool having an interior threaded bore to be mounted on said plug, the movement of the shaft on the threads on said plug tending to tighten the spool and the plug when the shaft is driven, a cover for said magazine, and a socket journal element on the cover adapted to connect the free end of the take-up shaft with the cover.

ALBERT KINDELMANN.
ELLIS L. JONES.
JULIUS PEARLMAN.
WILLIAM OSTRANDER.